J. C. MACKIE.
BURGLAR-ALARM.
No. 193,260. Patented July 17, 1877.
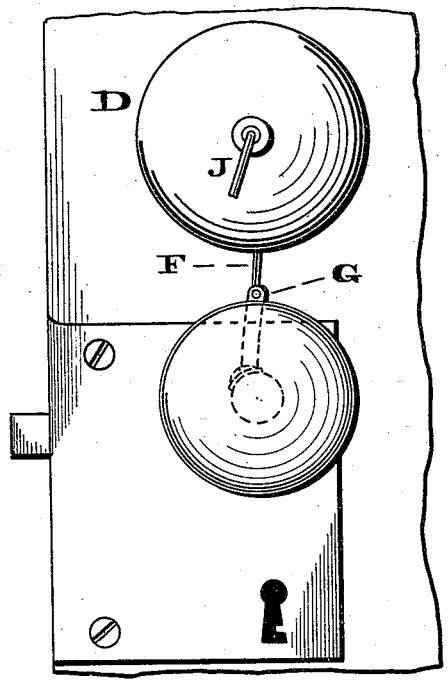
Fig. 1.
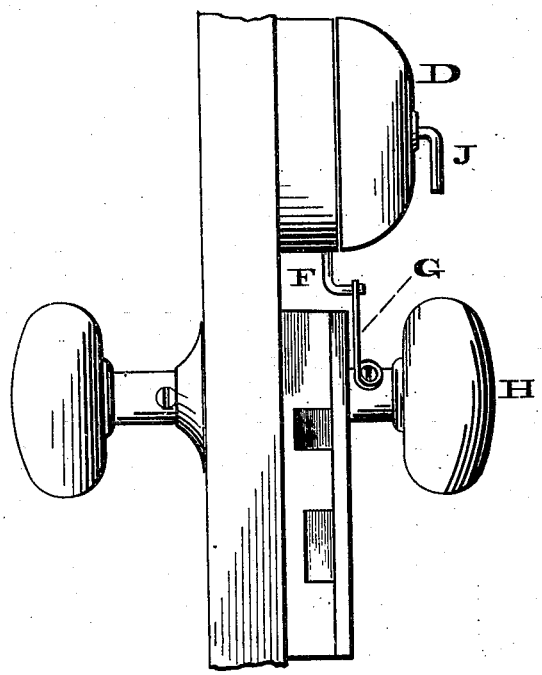
Fig. 2.
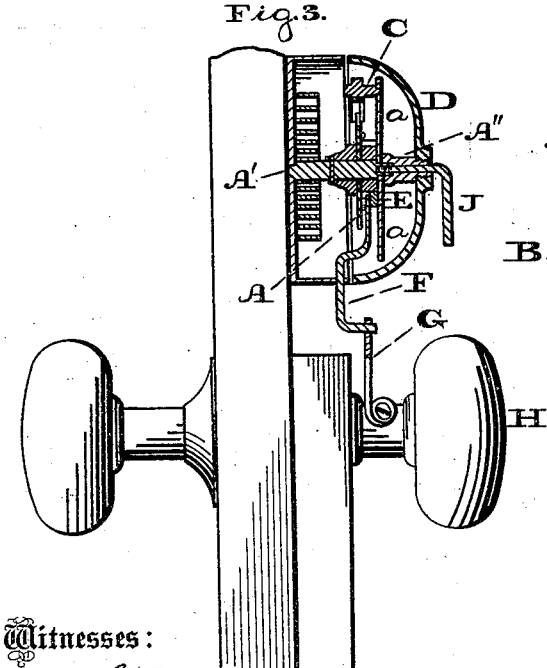
Fig. 3.
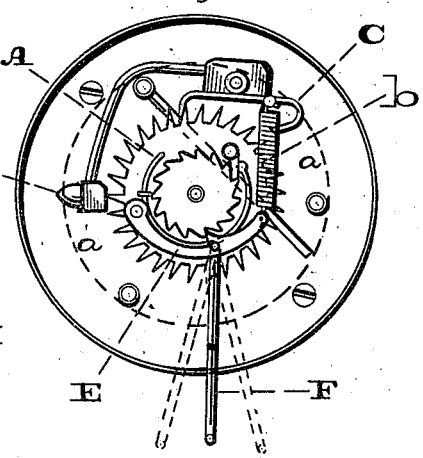
Fig. 4.
Fig. 5.
Witnesses:
Lewis F. Brous,
A. P. Grant.
Inventor:
John C. Mackie,
by John A. Wiedersheim
Attorney.

UNITED STATES PATENT OFFICE.

JOHN C. MACKIE, OF PHILADELPHIA, PENNSYLVANIA.

IMPROVEMENT IN BURGLAR-ALARMS.

Specification forming part of Letters Patent No. 193,260, dated July 17, 1877; application filed April 19, 1877.

*To all whom it may concern:*

Be it known that I, JOHN C. MACKIE, of the city and county of Philadelphia, and State of Pennsylvania, have invented a new and useful Improvement in Burglar-Alarms and Hotel-Calls, which improvement is fully set forth in the following specification and accompanying drawings, in which—

Figure 1 is a front view of the device embodying my invention. Fig. 2 is a side view thereof. Fig. 3 is a transverse section thereof. Fig. 4 is an inside view thereof. Fig. 5 is a detached view of the winding-crank.

Similar letters of reference indicate corresponding parts in the several figures.

My invention relates to improvements in an alarm or call, which may be connected to a door-knob, shutters, or other insecure places.

The invention consists of a crank or pin fitted to the center-post of the clock mechanism, so as to provide convenient means of winding said mechanism, and dispense with a separate and easily-misplaced key, said crank or pin being directed to the center-post through a boss or collar on which the gong is mounted.

Referring to the drawings, A represents a system of clock or spring mechanism, which is to be attached to a door near the knob thereof, and its object is to impart motion to a hammer, B, attached to the pallet-arm C of said mechanism, and adjacent to which is a gong, D, adapted to be struck by the hammer.

To the frame *a* of the clock mechanism there is pivoted a dog or stop-pawl, E, having a tooth which engages with one of the ratchet-wheels of said mechanism, and it is held thereagainst by a spring, *b*, connected to the frame *a*.

From the dog E there is suspended, by a pivotal joint, an arm, F, whose lower end is adapted to engage with an arm, G, which projects upward, and is secured to the collar, spindle, or stem of the door-knob H, said arms F and G being formed, respectively, with a hook and eye, so that they may be readily detached by withdrawing the hook from the eye, which motion is permitted by the loose pivotal joint of the arm F and dog or detent E.

The operation is as follows: When the door is closed the arms F and G will be connected, and the clock mechanism properly wound, whereby said mechanism will be controlled by the door-knob.

When attempts are made to open the door by turning the knob, the rotation of the latter, and consequent movement of the arm G, draws down the dog E, whereby the ratchet engaged thereby is released, and the train or mechanism set in motion, thus operating the hammer B and sounding the alarm.

It will be noticed that owing to the free connection of the arms F G, and arm F and dog E, the said dog will be depressed and disengaged from the respective ratchet, whether the knob is turned to the right or left, thus insuring reliability of the alarm.

As soon as the knob is let go the spring *b* restores the dog to its normal position in contact with its ratchet, and the alarm will be stopped; but should the knob be again turned, the alarm will be repeated, and this will continue as long as the spring of the mechanism A has power to unwind the latter.

It will be seen that the device, as described, may be employed as an alarm or call for apartments of hotels, &c., from the outside without the necessity of knocking at the doors, and it may be applied to shutters and other insecure places.

In order to wind the mechanism A I employ a crank or pin, J, one limb or end of which is screw-threaded, so as to be screwed to the center-post A', and said post is in line with the collar A'', on which the gong is mounted, said collar having an opening through which the threaded limb or end of the crank or pin J is passed loosely, in order that it may reach and be connected to the post A'.

By this provision there is no necessity of a separate key, or liability of loss of the same, and, as the crank will be preferably two-limbed, it provides a simple, easily-operated, and compact winding device for the alarm or call.

When the alarm or call is not required, the arms F G will be separated or disengaged, and the knob may be turned without operating the arm F and dog E, whereby an alarm will not be sounded.

Having thus described my invention, what I claim as new, and desire to secure by Letters Patent, is—

The crank or pin J, in combination with the winding-post A' and with the collar A'', supporting the gong and directing the crank or pin to said post A', substantially as and for the purpose set forth.

JOHN C. MACKIE.

Witnesses:
 LEWIS F. BROUS,
 WM. B. HILT.